United States Patent Office 3,703,465
Patented Nov. 21, 1972

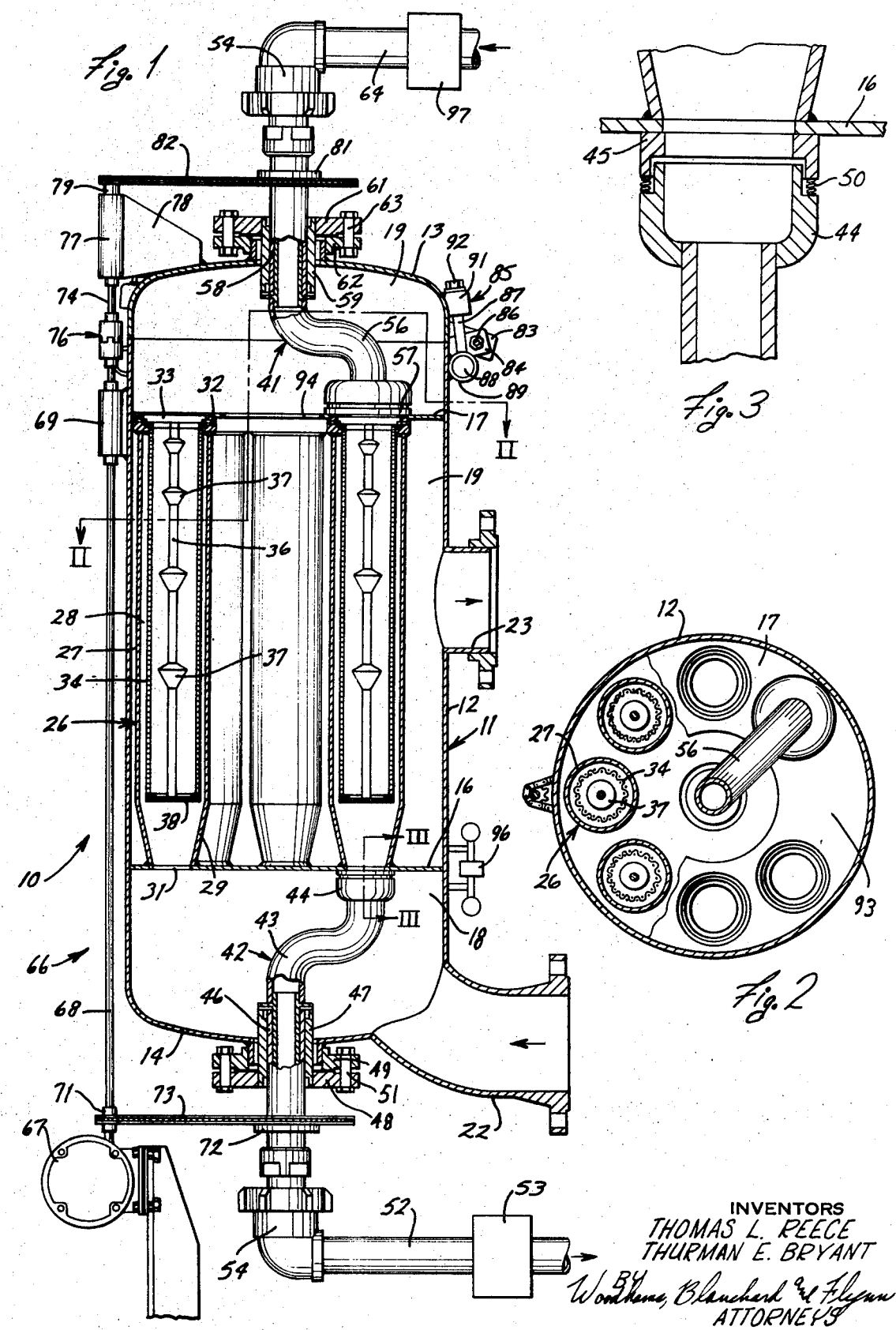

3,703,465
FILTER WITH ROTATING BACKWASH SELECTOR
Thomas L. Reece, Portage, and Thurman E. Bryant, Richland Township, Kalamazoo County, Mich., assignors to Dover Corporation, New York, N.Y.
Filed Dec. 14, 1970, Ser. No. 97,843
Int. Cl. B01d 35/12, 29/38
U.S. Cl. 210—333                          8 Claims

ABSTRACT OF THE DISCLOSURE

A filter assembly having a plurality of individual filter units, each including an impervious outer skirt surrounding an elongated filter member. A fluid-solid mixture is supplied to the filter units in a direction to flow radially inwardly through the filter member. Rotatable backwash arms are disposed adjacent the opposite ends of the filter units for sequentially and progressively permitting backwashing thereof. The backwash fluid flows radially outwardly through the filter members for removing the collected solid material. The backwash arms are connected to inlet and outlet pipes, with the inlet pipe being connected to an external source of a separate backwash fluid. The backwash arms are rotatably driven by means of an external drive system which includes disconnectible means for enabling one end of the filter housing to swingably move into an open position, carrying with it the backwash arm connected thereto, for permitting servicing of the individual filter units.

FIELD OF THE INVENTION

This invention relates to a filter assembly and, in particular, to an improved filter assembly having a plurality of individual filter units and a pair of rotatable backwash arms positionable adjacent the opposite ends of each filter unit for permitting backwashing of the individual filter units by means of a separate backwash fluid.

BACKGROUND OF THE INVENTION

It is well known that filter assemblies used for removing solid particles from a liquid or gas must have the filters periodically cleaned in order to permit a continuous throughflow while at the same time perform an effective filtering operation. Most known filter assemblies containing a plurality of individual filter units have utilized a rotatable backwash arm which is sequentially positionable adjacent the filter units for permitting backwashing of the individual filter units for removing the collected solid material. The backwashing operation in this type of filter assembly normally utilizes the filtrate for backwashing, the filtrate being allowed to flow backwards through the filter units for removing the solid particles from the filter screen. While the use of the filtrate is effective for removing the solid materials deposited in the filter unit, nevertheless use of the filtrate is often undesirable since the filtrate in many situations is a costly solution which is preferably utilized for some other purpose. Thus, having to utilize a portion of the filtrate for backwashing purposes results in an inefficient, and often costly, wastage of the filtrate.

A further disadvantage of many known filter assemblies has been their inability to completely and efficiently remove all of the solid material from the filter. Many known filter assemblies have utilized elongated sleeve-like filter members for removing the solid material from the gas or liquid, the mixture as supplied to the filter being supplied to the interior thereof whereby the liquid or gas then flows radially outwardly through the filter with the solid material being deposited on the internal wall of the filter. While this flow pattern is effective in removing the solid material from the mixture, nevertheless cleaning of the filter cannot be thorough since the amount of backwash fluid (or filtrate) flowing inwardly through the filter will only be that amount sufficient to equalize the pressure in the outlet drain for the backwash flow. Solids will only be removed from that portion of the filter screen sufficient to provide enough open screen area to allow sufficient backwash flow for this pressure equalization. Thusly, it can be seen that there is no direct relationship between backwash fluid flow and removal of solid particles from the internal surface or the filter screen.

Accordingly, it is an object of the present invention:
(1) To provide an improved filter assembly having an improved backwash system for improving the backwash efficiency, minimizing the backwash time, and maximizing the operational time and throughput of the filter assembly.
(2) To provide a filter assembly, as aforesaid, wherein a plurality of individual filter units are disposed adjacent one another, such as in a circular pattern, with the opposite ends of the individual filter units being cooperable with rotating backwash arms for permitting the individual filter units to be backwashed by means of a separate backwash fluid.
(3) To provide a filter assembly, as aforesaid, wherein the individual filter units each include a cylindrical filter element mounted so that the solid material is deposited on the outer circumferential periphery thereof, whereby the backwash fluid then flows radially outwardly through the filter elements to thereby permit the use of a diffuser internally of the filter to cause removal of deposited solids from the filter screen over the complete length thereof.
(4) To provide a filter assembly, as aforesaid, wherein the pair of rotating backwash arms are rotatably mounted on heads disposed adjacent the opposite ends of the filter housing, with the rotating backwash arms being drivingly interconnected by a simple disconnectible drive located externally of the housing for permitting one of the heads to be pivotally swung open for permitting easy replacement of the filter elements.
(5) To provide a filter assembly, as aforesaid, which results in an efficient backwash operation which effectively results in removal of substantially all of the collected solid material in a short backwash time, while at the same time permitting each filter unit to be operationally utilized for filtering purposes for a maximum amount of time so as to produce the maximum amount of filtrate, with none of the filtrate being utilized for backwashing purposes.
(6) To provide a filter assembly, as aforesaid, which does not require the use of closely fitting fluid tight seals between the adjacent ends of the filter units and the rotating backwash arms, flow through the outlet pipe of the backwash system being controlled by means of a valve.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a sectional view of a filter assembly constructed according to the present invention.
FIG. 2 is a cross-sectional view taken along the line II—II of FIG. 1.
FIG. 3 is a fragmentary cross-sectional view taken along the line III—III of FIG. 1.

Certain terminology will be used in the following description for convenience in reference only and will not be limiting. The words "upwardly," "downwardly," "leftwardly" and "rightwardly" will refer to directions in the drawings to which reference is made. The word "forwardly" will refer to the normal flow direction of the mixture through the filter apparatus, which flow direction through the individual filter units is upwardly in FIG. 1. The word "rearwardly" will refer to the opposite flow direction, namely flow downwardly through the filter units as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a filter assembly having a housing containing an intermediate wall which divides the housing into a pair of chambers. A plurality of individual filter units are disposed within the housing and provide communication between the pair of chambers. Each filter unit includes an impervious outer sleeve or skirt connected to the partition member, and an elongated cylindrical filter member disposed inside the skirt. The cylindrical filter is closed at one end and open at the other end. A fluid-solid mixture is supplied to one chamber adjacent the closed end of the filter, whereupon the mixture flows into the skirt and radially inwardly through the filter, with the filtrate then flowing out the open end of the filter into the other chamber. The filtrate is then discharged to an external receiver. The solid material is thus deposited or collected on the outer cylindrical periphery of the filter member.

The filter assembly also includes an improved backwash system for permitting removal of the collected solid material from the filter element. The backwash system includes a rotatable backwash arm disposed within each of the chambers, which backwash arms are each rotatably mounted relative to the housing and have a flow passageway therethrough whereby the arms are synchronously driven so as to be sequentially positionable adjacent the opposite ends of the individual filter units for permitting the individual filter units to be backwashed. The backwash arm disposed in said other chamber is connected to an external source of a backwash liquid, whereupon a separate backwash liquid or fluid is then supplied into the interior of the filter member, with the backwash liquid then flowing radially outwardly through the filter member to effectively remove the collected solid material therefrom. The backwash liquid containing the solid material therein is then discharged through the backwash arm contained in said one chamber. The backwash arms are connected by a drive mechanism for synchronous rotation, which drive mechanism contains a separable coupling therein for permitting one end of the housing to be pivotally swung to an open position, thereby carrying with it the associated backwash arm for permitting the individual filter members to be easily replaced.

DETAILED DESCRIPTION

FIG. 1 illustrates therein a filter assembly 10 constructed according to the present invention, which filter assembly includes a housing 11 having a cylindrical intermediate body portion 12, an upper head or end portion 13 and a similar lower head or end portion 14. A platelike partition member 16 is disposed within the housing 11 and divides same into opposite chambers or compartments 18 and 19. An inlet pipe 22 is connected to the housing 11 for communication with the chamber 18, the inlet pipe 22 being used for supplying to the filter assembly a suitable fluid-solid mixture, such as a liquid-solid mixture. A further pipe 23, hereinafter referred to as the outlet pipe, communicates with the other chamber 19 for permitting the filtrate to be discharged from the filter assembly.

The housing 11 has a plurality of separate filter units 26 therein, which filter units are angularly spaced from one another in a circular array substantially as illustrated in FIG. 2. The filter units 26 are all of identical construction and thus only one of the units will be described in detail.

Specifically, the filter unit 26 includes an impervious tubular shell or skirt 27 disposed within the outlet chamber 19 and extending between the partition 16 and a mounting member 17. The mounting member 17 is disposed within the outlet chamber 19 and is provided for connecting the upper end of the skirt 27 relative to the surrounding housing 11. The skirt 27 defines a filter chamber 28 within the interior thereof, and additionally has a conical end portion 29, which end portion is fixedly secured, as by welding, to the mounting member 17. The opening formed in the conical end portion 29 is disposed in coaxial alignment with an opening 31 as formed in the mounting member 17. The other end of the skirt 27 is fixedly secured, as by welding, to an annular mounting member or ring 32, which ring is fixedly secured to the partition 16 in surrounding relationship to a circular opening 33 therein.

The filter unit 26 further includes a cylindrical filter element 34 disposed coaxially within the shell 27. The upper end of the filter unit 34 is open and is fixedly connected to the annular mounting member 32 for permitting the filter element 34 to be freely suspended within the tubular shell 27. The lower end 38 of the filter element 34 is closed for preventing throughflow of the fluid-solid mixture. The filter element 34 is preferably constructed of a metal mesh-like material with the size of the mesh being selected to conform with the desired filtering operation. Such filtering elements are well known and thus further description thereof is not believed necessary.

The filter element 34 also has a diffuser means 36 positioned centrally therein, which diffuser means functions as a backwash flow control member and has a plurality of conical flow directing portions or diffusers 37 secured thereto. The diffusers 37 are spaced axially along the length of the filter element and are of increasing size in the direction away from the opening 33 for a purpose to be explained hereinafter.

Considering now the backwash system, same includes an inlet backwash arm 41 disposed within the outlet chamber 19 and rotatably mounted on the upper head 13, and an outlet backwash arm 42 disposed within the inlet chamber 18 and rotatably mounted on the lower head 14.

The outlet backwash arm 42 comprises a hollow, substantially Z-shaped arm or crank 43 having a cup-shaped member 44 (FIGS. 1 and 3) provided on the free end thereof, which cup-shaped member has an annular ring-like seal member 45 disposed to slidably engage the partition plate 16. If desired, suitable springs or other resilient devices 50 can be provided between the cup-shaped member 44 and the seal member 45 to resiliently urge the seal member 45 into sliding bearing engagement with the partition 16.

The other end of the arm 43 is fixedly secured to a discharge pipe 46 which extends outwardly through the head 14 and is rotatably received within a sleeve portion 47, the sleeve portion 47 being fixedly secured to a removable flange 48. The flange 48 is in turn fixedly secured, as by bolts 51, to a further flange 49 which is stationarily secured to the lower head 14.

The lower end of the discharge pipe 46 extends into a rotary joint 54, which joint is also connected to a further discharge pipe 52, which pipe is provided with a conventional valve 53 for controlling the flow therethrough.

The upper or inlet backwash arm 41 is substantially identical in construction to the outlet backwash arm 42 as described above. Specifically, the inlet backwash arm 41 also includes a Z-shaped hollow arm 56 having a suitable cup-shaped member 57 on the end thereof, which member has an annular ring disposed for sliding sealing engagement with the platelike mounting member 17. The other end of the arm 56 is fixedly secured to an inlet pipe 58 which extends through the head 13 and is rotatably received within the sleeve 59, which sleeve 59 is fixedly secured to the flange 61. Flange 61 is in turn fixedly secured to the flange 62 by means of bolts 63. The flange 62 is fixedly secured to the head 13 by any convenient means, as by welding. The outer end of the inlet pipe 58 is in turn connected to a supply pipe 64 by means of an intermediate rotary joint 54. The pipe 64 preferably has a manual valve 97 therein and is connected to a source (not shown) of a backwash fluid, particularly a liquid, which liquid is maintained separate from the filtrate and thus can be different from the filtrate.

The backwash arms 41 and 42 are synchronously rotatable by means of any suitable drive mechanism 66, here a mechanism disposed exteriorly of the housing 11. The drive mechanism 66 in this includes a motor 67 drivingly connected to a drive shaft 68 by any conventional means, such as by a conventional gear reduction unit (not shown). The upper or free end of the drive shaft 68 is rotatably supported by means of a bearing 69 which is mounted on the housing 11. The drive shaft 68 has a drive sprocket 71 nonrotatably secured thereto, which is in turn drivingly connected to a driven sprocket 72 nonrotatably secured to the discharge pipe 46. Sprockets 71 and 72 are interconnected in a conventional manner, as by a chain 73.

The drive mechanism 66 further includes a drive shaft extension 74 disposed adjacent and coaxially aligned with the drive shaft 68. The drive shaft extension 74 and the drive shaft 68 are nonrotatably coupled together by means of a releasable jaw-type clutch or coupling 76, which coupling is of conventional construction. The drive shaft extension 74 is rotatably supported by means of a sleeve bearing 77 as provided on a mounting bracket 78 fixedly secured to the head 13. A drive sprocket 79 is nonrotatably mounted on the drive shaft extension 74. A further driven sprocket 81 is nonrotatably mounted on the inlet pipe 58 and is drivingly connected to the drive sprocket 79 by means of an intermediate chain 82. The drive sprockets 71 and 79 are identical, as are the driven sprockets 72 and 81 for causing identical and synchronous rotation of the backwash arms 41 and 42.

The releasable coupling 76 as provided between the drive shaft 68 and the drive shaft extension 74 is provided so as to permit the head 13 to be pivotally moved into an open position relative to the cylindrical body portion 12 of the housing. The head 13 is specifically provided with an arm 83 fixedly secured thereto, and a further arm 84 is fixedly secured to the cylindrical body portion 12, the two arms 83 and 84 being pivotally connected by means of a pivot pin 86. This pivotable connection thus permits the head 13 to pivotally swing upwardly into an open position so as to provide free access to the filter elements 34.

When the head 13 is in the closed position adjacent the body portion 12 in the manner illustrated in FIG. 1, the head 13 is fixedly secured to the body portion 12 by means of a plurality of clamping bolt units 85 disposed around the periphery thereof. Each clamping bolt unit 85 includes a bolt 87 secured to a pin 88, which pin 88 is rotatably received within a hinge sleeve 89 fixedly secured to the tubular body portion 12. A pair of spaced brackets 91 are fixedly secured to the head 13 for permitting the pin 87 to extend therebetween, the upper end of the pin 87 being threaded and having a nut 92 threadably engaged thereon for abutting against the brackets 91.

While the description as set forth above discloses the use of sprockets and chains for drivingly interconnecting the drive shaft to the backwash arms, it will be readily apparent that such drive connection could be replaced by any other suitable drive mechanism, such as a worm and worm gear arrangement.

Further, while the drawings disclose the use of seven filter units 26, it will be readily apparent that this number of units is merely for purposes of illustration since the number of filter units may be increased or decreased to accommodate varied filtrate flow requirements.

OPERATION

The operation of the filter apparatus according to the present invention will be briefly described to ensure a complete understanding thereof.

When the filter assembly 11 is to be utilized, the backwash arms 41 and 42 will normally occupy a blank or vacant space provided on the partition 16 and mounting plate 17, such as the space 93 illustrated in FIG. 2, the backwash arms thus being disposed in an inoperative position. With the backwash arms in this position, all of the filter units 26 are thus uncovered for permitting flow communication between the chambers 18 and 19.

When in the above-described condition, the fluid mixture, such as a liquid-solid mixture, is supplied through inlet pipe 22 into the inlet chamber 18, whereupon the fluid then flows through the openings 31 into the filter chambers 28 as defined by the impervious tubular skirts 27. The fluid then flows radially inwardly through the pervious filter elements 34, which filter elements cause the solid material to be separated from the fluid, the solid material collecting on the outer periphery of the cylindrical filter elements 34. The filtered fluid, that is, the filtrate, then flows through the openings 33 into the upper portion of outlet chamber 19, with the fluid then flowing through opening 94 into the lower portion of outlet chamber 19 and then out the discharge pipe 23.

When it is necessary or desired to clean the filter assembly so as to remove the solid material which has collected on the filter elements 34, the motor 67 is energized so as to cause a corresponding and synchronous rotation of the arms 41 and 42, which arms are then rotatably displaced from the vacant spaces 93 into a position in alignment with an adjacent one of the filter units 26, substantially in the manner as illustrated in FIG. 2. With the arms 41 and 42 positioned so that the cup members 44 and 57 overlie the openings 31 and 33, respectively, then the selected filter unit will be isolated from the chambers 18 and 19 so that no additional fluid-solid mixture will be supplied thereto. However, all of the other filter units will still be in communication with the chambers and will thus continue to operate in the normal manner.

With the arms 41 and 42 positioned in alignment with the selected filter unit, the valves 53 and 97 will then be opened and a separate backwash fluid will then be supplied through the supply pipe 64 into the hollow backwash arm 41, whereupon the backwash liquid will flow through the opening 33 into the interior of the filter element 34. Due to the presence of the conical diffusers 37, the backwash fluid will be deflected radially outwardly over substantially the complete length of the filter element so as to flow radially outwardly through the perforated wall thereof, which radial outward flow of backwash fluid causes the solid material to be removed from the filter element. The backwash liquid, with the solid material therein, will then flow downwardly through the skirt 27 and through the opening 31 into the lower backwash arm 42, which backwash liquid will then flow through the discharge pipe 52 to be disposed of at an external location.

After the first filter unit 26 has been backwashed in the above manner, then the backwash arms will again synchronously rotate so as to align with the next filter unit, which process will be sequentially repeated until all of the filter units have been backwashed, whereupon the arms may again be stepped into the rest or inoperative space 93 or continued as needed. When the backwash arms are returned to the space 93, the valves 53 and 97 will then be closed, the valve 53 preventing the filtrate from leaking into and escaping through the discharge pipe 52.

When it is desired to change one of the filter elements 34, the clamping bolt units 85 are released by first releasing the nuts 92 so as to permit the clamp pins 87 to swing outwardly away from the lugs 91. The head 13 and the arm 41 are then, assuming suitable disconnect or flexibility in the pipe 64, pivotally swung upwardly about the hinge axis 86, which swinging movement causes the coupling device 76 to be disconnected. The swinging movement of the head with the backwash arm thereon can be accommodated by providing the supply pipe 64 with a flexible portion, or by providing some other suitable disconnect within the supply pipe.

The operation of the filter assembly 11 is preferably automatically controlled so that the backwash operation is automatically carried out whenever the control system senses the need for a backwash operation. Particularly, the assembly 11 is preferably provided with a pressure sensor 96 which is responsive to the difference in pressure between the inlet compartment 18 and the outlet compartment 19, which sensor is actuated when such difference exceeds a preset amount, thus indicating that flow therethrough is being undesirably restricted. The pressure sensor, when responsive to a predetermined drop in pressure in filtrate, can thus be utilized to actuate the motor 67 so as to cause the backwash arms to be sequentially stepped around the filter units so as to clean same. The backwashing of the individual filter units can be controlled by means of a preset adjustable timer which controls the amount of backwash time for each individual unit and which causes the backwash arms to be sequentially stepped to the next position at the end of each backwashing or cleaning cycle.

In the event that a pressure sensor is not utilized for initiating a backwashing cycle, then a preset adjustable timer can be utilized for energizing motor 67, which timer will be set so as to cause the complete backwash operation to be sequentially initiated after the filter assembly has been operated for a predetermined time.

While the filter assembly as illustrated and described has the outlet line 23 connected to the lower portion of outlet chamber 19, it will be readily apparent that the outlet line 23 could also be connected directly to the upper portion of chamber 19 if so desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A filter assembly for removing contaminants from a fluid, comprising:
   closed, hollow housing means having first and second end portions fixedly interconnected by an intermediate tubular portion;
   wall means including a partition member fixedly secured to said housing means and dividing same into first and second chambers, the first and second chambers being disposed adjacent the first and second end portions, respectively, of the housing means;
   inlet conduit means fixedly connected to said housing means and in communication with said first chamber for supplying a fluid-solid mixture thereto;
   outlet conduit means fixedly secured to said housing means and in communication with said second chamber for discharging filtrate therefrom; and
   filter means mounted within said housing means for removing a majority of solid material from the fluid-solid mixture when the fluid flows from the first chamber to the second chamber, said filter means including a plurality of separate filter units disposed in an arcuate arrangement within said housing means;
   each filter unit including:
      (a) an impervious, elongated annular housing member disposed within said housing means and fixedly secured to said partition member and having openings in opposite ends thereof for providing communication between said first and second chambers, and
      (b) an elongated, mesh-like, cylindrical filter element disposed within said housing member and spaced radially inwardly from the sidewalls thereof, said filter element having one end closed and the other end open, the open end of the filter element being connected to the surrounding housing member;
   backwash means for sequentially and intermittently backwashing and cleaning the individual filter units with a backwash fluid separate from the filtrate contained in said filter assembly, said backwash means including first and second backwash arm means disposed within said second and said first chamber, respectively, and rotatively supported on said housing means, said first and second backwash arm means each having a flow passageway therethrough and means thereon for cooperation with the opposite ends of the individual filtering units for permitting the individual filter units to solely communicate with the passageway formed in said first and second backwash arms; and
   inlet and outlet pipes located exteriorly of said housing means and connected to said first and second backwash arm means, respectively, said inlet pipe communicating with an external source of said backwash fluid.

2. A filter assembly for removing contaminants from a fluid, comprising:
   closed housing means having internal wall means dividing said housing means into an inlet chamber and an outlet chamber;
   said housing means including an inlet conduit in communication with said inlet chamber for supplying a fluid-solid mixture thereto;
   said housing means also including an outlet conduit in communication with said outlet chamber for discharging the filtrate therefrom;
   filter means mounted within said housing means for removing a majority of solid material from the fluid when the fluid flows from the inlet chamber to the outlet chamber, said filter means including a plurality of separate filter units disposed in a circular arrangement within said housing means;
   each filter unit including:
      (a) an impervious, elongated housing member having an opening in one end thereof in communication with said inlet chamber for permitting the fluid-solid mixture to enter therein;
      (b) an elongated, mesh-like, cylindrical filter element disposed within said housing member and spaced radially inwardly from the sidewalls thereof, said filter element having one end closed and the other end opened, the closed end of said filter element being disposed closely adjacent the one end of said housing member, and the other end of the filter element being connected to the housing member and being disposed in open communication with said outlet chamber,
      (c) whereby the mixture as supplied from the inlet chamber into the housing member then flows radially inwardly through the filter element with the solid material being collected or deposited on the outer peripheral wall of the filter element;
   backwash means for sequentially and intermittently backwashing and cleaning the individual filter units with a backwash fluid separate from the filtrate contained in said filter assembly, said backwash means including first and second backwash arm means disposed within said outlet chamber and said inlet chamber, respectively, and rotatably supported on said housing means for rotation about a substantially common axis;

said first and second backwash arm means each having a flow passageway therethrough and means thereon sealingly cooperating with the opposite ends of the individual filter units for permitting the individual filter units to solely communicate with the passageways formed in said first and second backwash arm means; and inlet and outlet pipes located exteriorly of said housing means and connected to said first and second backwash arm means, respectively, said inlet pipe being adapted to communicate with an external source of said backwash fluid, whereby the backwash fluid flows through said first backwash arm means into the filter element and then radially outwardly through the cylindrical pervious wall of the filter element for dislodging the solid material deposited thereon, the backwash liquid and the solid material then being discharged through said second backwash arm means.

3. A filter assembly according to claim 2, further including drive means disposed exteriorly of said housing means and connected to said first and second backwash arm means for causing synchronous rotation thereof.

4. A filter assembly according to claim 3, wherein said housing means includes an elongated tubular central portion and a pair of opposite end portions, means pivotably mounting one of said end portions to said central portion for permitting swinging movement of said one end portion into an open position, said first and second backwash arm means each being rotatably mounted on a corresponding one of said end portions, and said drive means including disconnectible coupling means which are automatically disconnected in response to swinging movement of said one end portion toward said open position.

5. A filter assembly according to claim 4, wherein said drive means includes elongated shaft means disposed exteriorly of and extending longitudinally of said housing means, said disconnectible coupling means being disposed intermediate said elongated shaft means substantially at the interface between said one end portion and the adjacent end of said central housing portion.

6. A filter assembly according to claim 2, wherein each of said filter units includes a diffuser means disposed centrally within and extending longitudinally along the axis of the filter element, said diffuser means including a plurality of axially spaced, progressively enlarging, conical diffuser members for causing the backwash fluid to be substantially uniformly radially deflected outwardly through the impervious walls of said filter element over substantially the complete axial length thereof.

7. A filter assembly according to claim 2, further including means defining a source of an external backwash fluid separate from the filtrate contained within said filter assembly, said source of backwash fluid being connected to said inlet pipe.

8. A filter assembly according to claim 2, further including valve means associated with said outlet pipe for controlling flow therethrough, said valve means being normally closed except when a backwashing operation is being performed.

References Cited
UNITED STATES PATENTS 3,380,591    4/1968    Muller   ---------- 210—333 X
3,169,109    2/1965    Hirs   ------------ 210—333 X FRANK A. SPEAR, Jr., Primary Examiner